(12) United States Patent
Choi et al.

(10) Patent No.: US 9,777,811 B2
(45) Date of Patent: Oct. 3, 2017

(54) SLIDING DOOR DEVICE FOR VEHICLE

(71) Applicants: Hyundai Motor Company, Seoul (KR); Kwangjin Co., Ltd., Asan-si (KR)

(72) Inventors: Jae Hong Choi, Hwaseong-si (KR); YoungBae Gong, Asan-si (KR)

(73) Assignees: Hyundai Motor Company, Seoul (KR); Kwangjin Co., Ltd., Asan-si (KR)

( * ) Notice: Subject to any disclaimer, the term of this patent is extended or adjusted under 35 U.S.C. 154(b) by 0 days.

(21) Appl. No.: 14/928,587

(22) Filed: Oct. 30, 2015

(65) Prior Publication Data
US 2016/0356069 A1     Dec. 8, 2016

(30) Foreign Application Priority Data

Jun. 2, 2015    (KR) ........................ 10-2015-0078180

(51) Int. Cl.
| | |
|---|---|
| *E05F 11/00* | (2006.01) |
| *F16H 19/06* | (2006.01) |
| *B60J 5/06* | (2006.01) |
| *F16H 19/04* | (2006.01) |
| *E05D 15/10* | (2006.01) |

(52) U.S. Cl.
CPC ................ *F16H 19/06* (2013.01); *B60J 5/06* (2013.01); *E05D 15/101* (2013.01); *F16H 19/04* (2013.01); *E05D 2015/1026* (2013.01); *E05D 2015/1031* (2013.01); *E05Y 2201/72* (2013.01); *E05Y 2201/722* (2013.01); *E05Y 2900/531* (2013.01)

(58) Field of Classification Search
CPC ........ E05D 15/0665; E05D 15/30; B60J 5/06; B60J 5/047; B60J 5/0472; F16H 19/04; F16H 19/06
See application file for complete search history.

(56) References Cited

U.S. PATENT DOCUMENTS

| | | | | |
|---|---|---|---|---|
| 4,268,996 A | * | 5/1981 | Allen | ........................ B60J 5/06 49/212 |
| 5,896,704 A | * | 4/1999 | Neag | ................... E05D 15/1081 296/155 |
| 6,183,039 B1 | * | 2/2001 | Kohut | ................. E05D 15/1081 296/146.12 |
| 7,000,977 B2 | * | 2/2006 | Anders | ................... E05D 15/48 296/146.12 |

(Continued)

FOREIGN PATENT DOCUMENTS

| | | |
|---|---|---|
| KR | 10-1998-0069736 A | 10/1998 |
| KR | 10-2016-0054223 A | 5/2016 |

*Primary Examiner* — Katherine Mitchell
*Assistant Examiner* — Abe Massad
(74) *Attorney, Agent, or Firm* — Morgan, Lewis & Bockius LLP

(57) ABSTRACT

A sliding door device for a vehicle may include a sliding door opening/closing a door opening formed in a vehicle body, a door rail mounted on the sliding door, a vehicle body rail mounted on the vehicle body, a central support structure for movably supporting the sliding door, a hook releasably locking the central support structure to the door rail, and a lower support structure for movably supporting a lower portion of the sliding door. The central support structure includes a central slider. The lower support structure includes a lower slider, a gear device, a link mechanism, a chain, and a chain tensioner.

15 Claims, 17 Drawing Sheets

(56) References Cited

U.S. PATENT DOCUMENTS

| | | | | |
|---|---|---|---|---|
| 7,144,068 B2 * | 12/2006 | Oxley | ............... | B60J 5/06 |
| | | | | 296/155 |
| 7,611,190 B1 * | 11/2009 | Elliott | ............... | B60J 5/06 |
| | | | | 296/146.12 |
| 7,810,282 B2 * | 10/2010 | Oxley | ............... | E05F 15/638 |
| | | | | 49/358 |
| 7,856,759 B2 * | 12/2010 | Elliott | ............... | E05D 15/58 |
| | | | | 49/358 |
| 8,353,555 B2 * | 1/2013 | Boettcher | ............... | B60J 5/06 |
| | | | | 296/146.12 |
| 2016/0123060 A1 * | 5/2016 | Choi | ............... | B60J 5/047 |
| | | | | 49/254 |
| 2016/0129769 A1 * | 5/2016 | Choi | ............... | B60J 5/0479 |
| | | | | 49/120 |

* cited by examiner

SLIDING DOOR DEVICE FOR VEHICLE

CROSS-REFERENCE TO RELATED APPLICATION

The present application claims priority of Korean Patent Application Number 10-2015-0078180 filed Jun. 2, 2015, the entire contents of which are incorporated herein by this reference.

BACKGROUND OF THE INVENTION

Field of the Invention

The present invention relates to a sliding door device for a vehicle, and more particularly, to a sliding door device for a vehicle, which is able to slidably move forward and backward in a longitudinal direction of the vehicle to open/close a door opening of a vehicle body.

Description of the Related Art

In general, a vehicle compartment having a predetermined size, which a driver or an accompanied passenger thereof can board is formed in a vehicle and a vehicle compartment opening/closing door is installed in a vehicle body in order to open/close the vehicle compartment.

In the case of a car, the vehicle compartment opening/closing door includes a front sliding door installed in a front side of a car in the longitudinal direction of the vehicle and a rear sliding door installed in a rear side of the car in the longitudinal direction of the vehicle and the front sliding door and the rear sliding door are generally installed in a vehicle body to be rotatable via a hinge.

In the case of a van which usually can accommodate more people, the vehicle compartment opening/closing door is configured to open/close the vehicle compartment while slidably moving forward and backward in the longitudinal direction of the vehicle.

In the case of a sliding type vehicle compartment opening/closing door of the van, the vehicle compartment opening/closing door opens the vehicle compartment by moving backward in the longitudinal direction of the vehicle and closes the vehicle compartment by moving forward in the longitudinal direction of the vehicle, and as a result, an opening/closing required space required for opening/closing the door is smaller than the hinge type vehicle compartment opening/closing door of the car and a door opening formed in the vehicle body can be fully opened even in the small opening/closing required space.

However, the sliding type vehicle compartment opening/closing door in the related art requires three support and guide rails supporting an upper portion, a middle portion, and a lower portion of the door while opening/closing the door and components related therewith to increase a weight and the number of components of the vehicle and degrade a degree of freedom of a design of the vehicle.

As a result, a 2-rail type vehicular sliding door device is developed, which supports the sliding door only with a door rail mounted on the vehicle compartment opening/closing door and a vehicle body rail mounted on the vehicle body to be slidably movable and an opening/closing operating feeling of the sliding door needs to be improved by appropriately controlling tension of a chain that transfers opening/closing operation force of the vehicle compartment opening/closing door to a gear device in the 2-rail type vehicular sliding door device.

The information disclosed in this Background section is only for enhancement of understanding of the general background of the invention and should not be taken as an acknowledgement or any form of suggestion that this information forms the prior art already known to a person skilled in the art.

SUMMARY OF THE INVENTION

The present invention has been made in an effort to provide a sliding door device for a vehicle which can slidably open/close a front sliding door forward and backward in a longitudinal direction of a vehicle and slidably open/close a rear sliding door backward and forward in the longitudinal direction of the vehicle to easily open/close the front sliding door and the rear sliding door even when a door opening/closing space is small. The present invention stably supports the front sliding door and the rear sliding door with only two rails to reduce the number of components, and a weight and manufacturing cost of the vehicle and improve a degree of freedom of an exterior design of the vehicle. The present invention smoothly transfers sliding door opening/closing operation force of an operator to a gear device to improve an opening/closing operation feeling of the sliding door.

In various aspects, the present invention provides a sliding door device for a vehicle, including: a sliding door opening/closing a door opening formed in a vehicle body; a door rail mounted on the sliding door; a vehicle body rail mounted on the vehicle body; a central support structure for movably supporting the sliding door, wherein the central support structure includes a central slider at one end and is fixedly mounted on the vehicle body at the other end, wherein the central slider is coupled to the door rail and movable along the door rail; a hook releasably locking the central support structure to the door rail; and a lower support structure for movably supporting a lower portion of the sliding door, wherein the lower support structure is connected to the lower portion of the sliding door at one end, wherein the lower support structure includes: a lower slider at the other end, wherein the lower slider is coupled to the vehicle body rail and movable along the vehicle body rail, a gear device mounted on the lower slider, a link mechanism of which one end is connected to the gear device and the other end is connected to the sliding door, a chain transmitting a motion of the link mechanism to the gear device, and a chain tensioner controlling tension of the chain.

Each of the door rail and the vehicle body rail may include a rail body having a substantially rectangular plate shape, and two guide rails which extend in a longitudinal direction along both edges in a width direction of the rail body and protrude in a direction substantially perpendicular to the rail body.

The vehicle body rail may be mounted on the vehicle body through a rail supporter.

The central slider may include a slider body in which a guide rail of the door rail is coupled to fit with a substantially quadrangular block shape, and a roller rotatably installed in the slider body and rollable along the guide rail while surface-contacting the guide rail of the door rail.

The central slider may include: a central slider mounting bracket; a pair of sliders mounted at an upper portion of the central slider mounting bracket; and a pair of sliders mounted at a lower portion of the central slider mounting bracket.

The central support structure may include a vehicle body mounting bracket fixedly mounted on the vehicle body; and a swing arm of which one end is rotatably coupled to the vehicle body mounting bracket and the other end is rotatably coupled to the central slider mounting bracket.

The swing arm may include: an upper swing arm disposed at an upper portion in a height direction of the swing arm; a lower swing arm disposed at a lower portion in the height direction of the swing arm; two flanges having a substantially quadrangular plate shape, which connect both edges of the upper swing arm and the lower swing arm; and a pressing edge which presses and pivots the hook is formed at one of the two flanges.

A through assembly hole may be formed at one edge of each of the upper swing arm and the lower swing arm; two fastening flanges may be provided in the central slider mounting bracket; and the two fastening flanges of the central slider mounting bracket are inserted between the upper swing arm and the lower swing arm to be rotatably coupled.

The vehicle body mounting bracket may have a cross-section in a substantially "⊏" shape and include a top flange, a bottom flange, and a side flange connecting the top flange and the bottom flange; one or more through assembly holes may be formed at the side flange, which is mounted on the vehicle body through the assembly holes; and a through assembly hole may be formed at each of the top flange and the bottom flange and the swing arm may be partially inserted between the top flange and the bottom flange to pivotably coupled.

An elastic spring may be interposed between the vehicle body mounting bracket and the swing arm to return the swing arm to an original position after the swing arm pivots with respect to the vehicle body mounting bracket.

The gear device may include: a rack gear mounted on the vehicle body rail; a gear shaft; a planetary gear box into which the gear shaft is inserted and coupled; an input gear rotatably coupled to an upper portion of the gear shaft; an output gear rotatably coupled to a lower portion of the gear shaft and engaged with the rack gear; and a transmission gear engaged with the input gear, having an arc shape, and mounted on the link mechanism.

The link mechanism may include: a first link having a cross-section in a substantially "⊏" shape, of which one end is fastened with the transmission gear; and a second link of which one end is fastened to the other end of the first link and the other end is fastened to the lower portion of the sliding door.

A fastening boss fastened with the other end of the second link with a pin may be integrally formed to protrude at a lower edge of the sliding door.

A first chain gear may be integrally fastened to a fastening portion where the other end of the first link and one end of the second link are fastened to each other, a second chain gear may be integrally fastened to a portion where one end of the first link and the transmission gear is fastened to each other, and the first chain gear and the second chain gear may be connected to each other by the chain to transfer a rotary motion.

The chain tensioner may be installed to be supported on the first link.

A diameter of the first chain gear may be smaller than a diameter of the second chain gear.

The chain tensioner may include a third chain gear through which the chain passes, two bushes supporting the third chain gear with the third chain gear interposed therebetween, an assembly pin fastened with two bushes through the third chain gear to rotatably support two bushes, and a chain tensioner body fastened with the third chain gear with the assembly pin to rotatably support the third chain gear and mounted on the first link.

The chain tensioner body may be fastened to the first link through an assembly bolt, and the assembly bolt may be inserted into the first link and a long hole capable of controlling the assembly position is formed in the first link.

According to various aspects of the present invention, in a sliding door device for a vehicle, front and rear sliding doors open/close a door opening of a vehicle body while slidably moving forward and backward along a door rail and a vehicle body rail in the longitudinal direction of the vehicle to easily open/close the door opening of the vehicle body even when an opening/closing space of a sliding door is small.

In addition, since an upper rail mounted on an upper portion of the vehicle body and devices related therewith are not required as compared with the sliding door in the related art, the number of components, a weight, and manufacturing cost of the vehicle can be reduced, a degree of freedom of a design of the vehicle can be improved, and degradation of external aesthetic can also be prevented.

Further, since the sliding door can stably pivot at a predetermined angle outward in the width direction of the vehicle and thereafter, smoothly move slidably along the door rail and the vehicle body rail, an opening/closing operation of the sliding door can be softly, smoothly, and stably performed.

Moreover, since opening/closing operation force of the sliding door can be smoothly transferred to a gear device through a chain and tension of the chain can be appropriately controlled, an opening/closing operation feeling of the sliding door can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION OF THE EMBODIMENTS

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
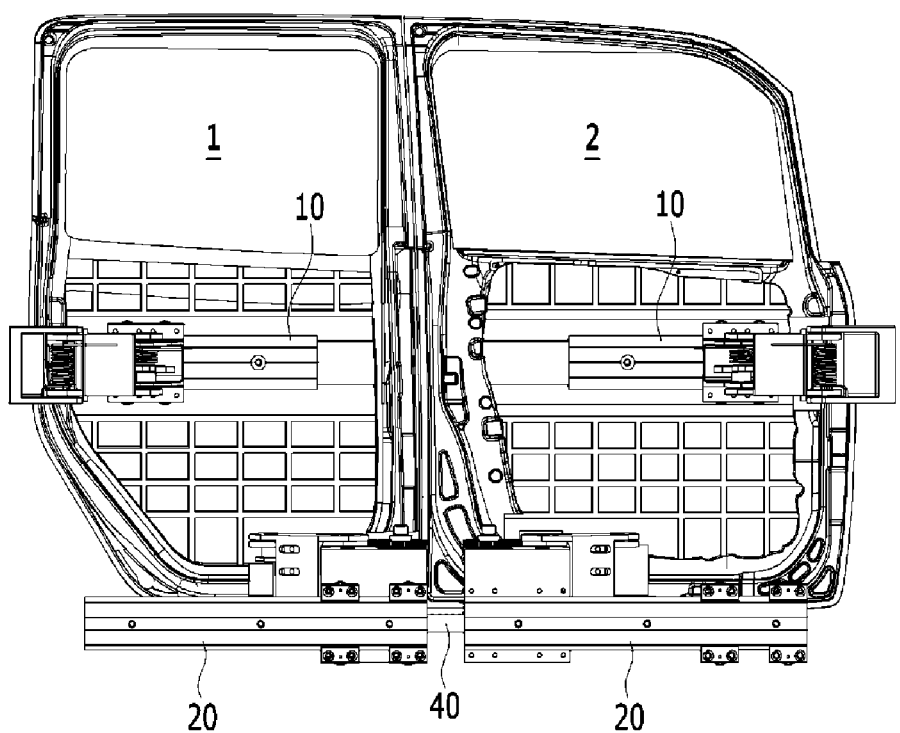
FIG. 1 is a perspective view illustrating a sliding door of a sliding door device for a vehicle fully closes a door opening of a vehicle body according to an exemplary embodiment of the present invention.

Referring to FIG. 1, a sliding door device for a vehicle according to some exemplary embodiments of the present invention may include a front sliding door 1 and a rear sliding door 2 opening/closing a door opening 3, 4 formed in a vehicle body.

The front sliding door 1 is disposed at a front side in the longitudinal direction of the vehicle to open/close a front door opening 3 formed in the vehicle body.

The rear sliding door 2 is disposed at a rear side in the longitudinal direction of the vehicle to open/close a rear door opening 4 formed in the vehicle body.

FIG. 1 is a front view illustrating a state in which the front sliding door 1 and the rear sliding door 2 fully close the front door opening and the rear door opening respectively, which is viewed from the inside of a vehicle compartment.

Figure 2:
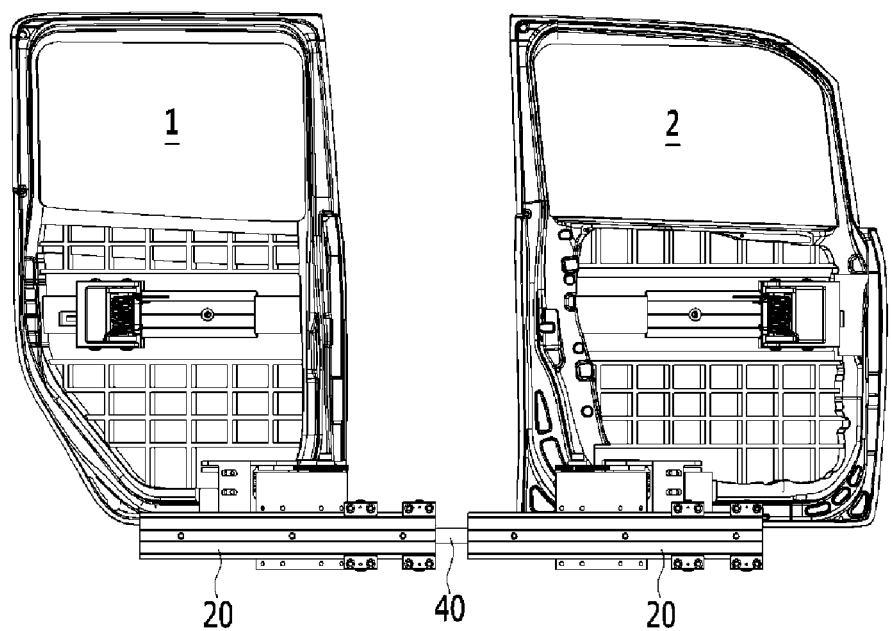
FIG. 2 is a perspective view illustrating a sliding door of a sliding door device for a vehicle moves forward and backward in the longitudinal direction of the vehicle to partially open a door opening of a vehicle body according to an exemplary embodiment of the present invention.

Referring to FIG. 2, the front sliding door 1 opens a part of the front door opening by slidably moving forward in the longitudinal direction of the vehicle and the rear sliding door 2 opens a part of the rear door opening by slidably moving backward in the longitudinal direction of the vehicle.

Figure 3:
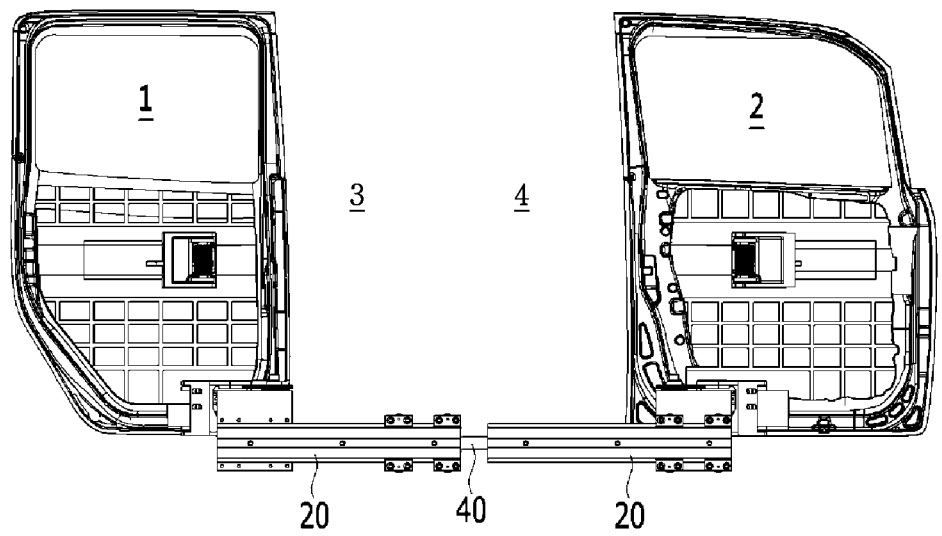
FIG. 3 is a perspective view illustrating the sliding door of the sliding door device for the vehicle moves forward and backward in the longitudinal direction of the vehicle to fully open the door opening of the vehicle body according to an exemplary embodiment of the present invention.

FIG. 3 illustrates a state in which the front sliding door 1 fully opens the front door opening 3 by slidably moving forward in the longitudinal direction of the vehicle and a state in which the rear sliding door 2 fully opens the rear door opening 4 by slidably moving backward in the longitudinal direction of the vehicle.

In some embodiments, door rails 10 which extend substantially straightly may be integrally fixedly mounted on inner surfaces of the front sliding door 1 and the rear sliding door 2 facing the vehicle compartment, respectively.

The door rail 10 may be mounted on a substantially middle portion in the height direction of the vehicle on the inner surface to extend forward and backward in the longitudinal direction of the vehicle.

Figure 4:
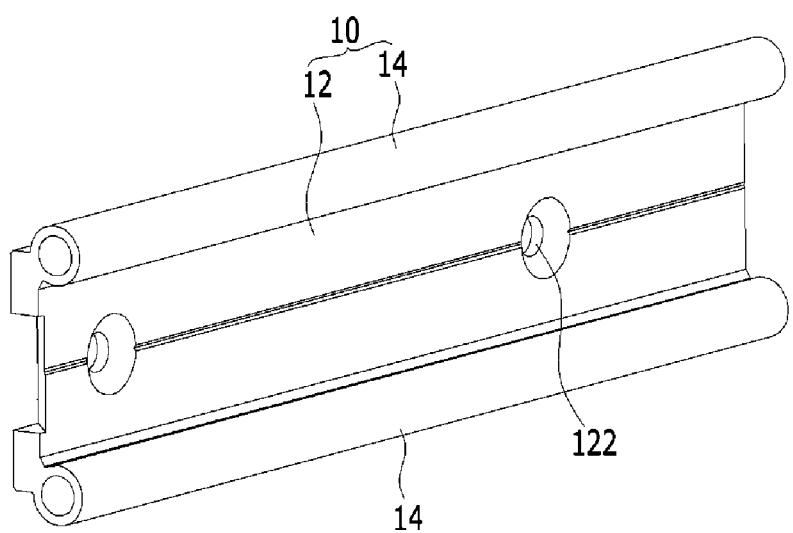
FIG. 4 is a perspective view of a door rail of a sliding door device for a vehicle according to an exemplary embodiment of the present invention.

Referring to FIG. 4, the door rail 10 may include a rail body 12 having a substantially rectangular plate shape and two guide rails 14 that extend in the longitudinal direction along both edges in the width direction of the rail body 12 and protrude in a vertical direction to the rail body 12, respectively. The guide rail 14 may be formed to have a circular cross-section.

Two through mounting holes 122 may be formed in the rail body 12 a predetermined interval in the longitudinal direction. The mounting hole 122 may be formed so as to be assembled to the front sliding door 1 and the rear sliding door 2 with a bolt, and the like.

Referring to FIG. 1, two vehicle body rails 20 corresponding to the respective door rails 10 of the front sliding door 1 and the rear sliding door 2, which extend straightly may be mounted on the vehicle body. Two vehicle body rails 20 may be disposed at the front side and the rear side in the longitudinal direction of the vehicle. Two vehicle body rails 20 may have the same shape as the door rail 10.

Figure 5:
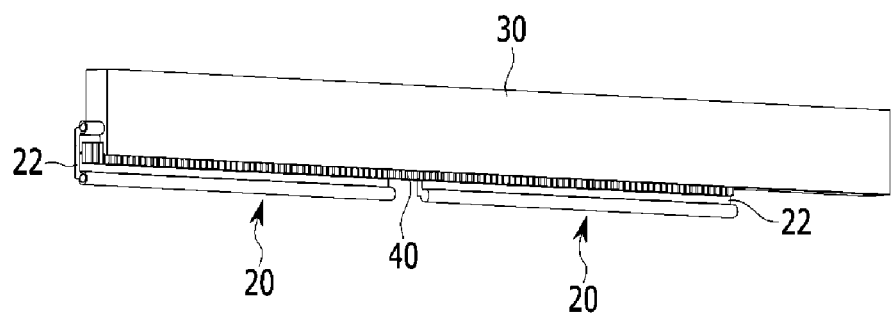
FIG. 5 is a combinational perspective view of a vehicle body rail, a rail supporter, and a rack gear according to an exemplary embodiment of the present invention.

Referring to FIG. 5, two vehicle body rails 20 may be mounted on the vehicle body while being coupled to a rail supporter 30 having a substantially rectangular block shape.

Rack gears 40 may be mounted on respective rail bodies 22 of two vehicle body rails 20. The rack gears 40 may be coupled to two vehicle body rails 20 in such a manner to connect two vehicle body rails 20. The rack gear 40 may also be coupled to the rail supporter 30 while a part of the rack gear 40 is inserted into the rail supporter 30.

The rack gear 40 may include multiple gears disposed at a predetermined interval in the longitudinal direction thereof and the multiple gears may be disposed toward the front sliding door 1 and the rear sliding door 2 (an outer portion of the vehicle in the width direction).

Figure 6:
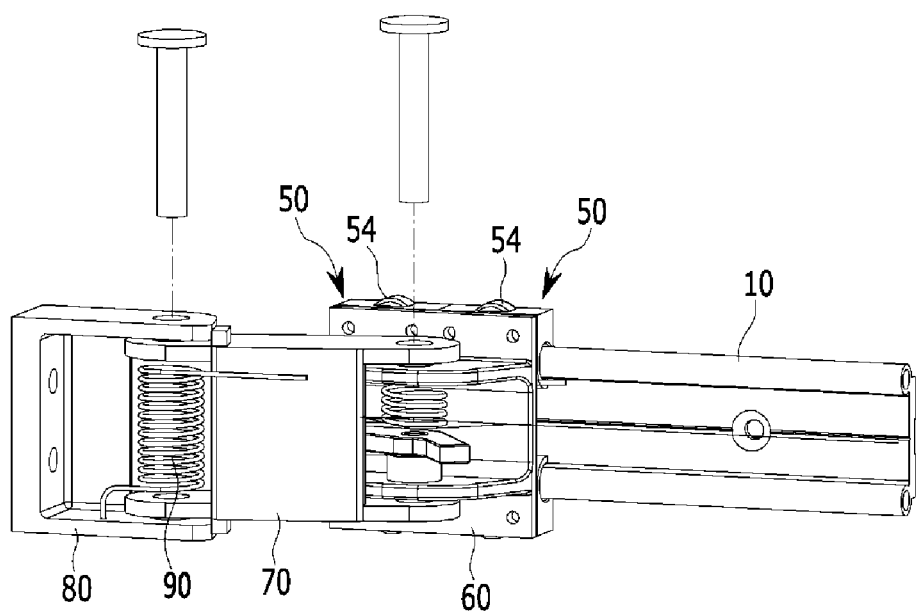
FIG. 6 is a combinational perspective view of a central support structure of a sliding door device for a vehicle according to an exemplary embodiment of the present invention.
Figure 7:
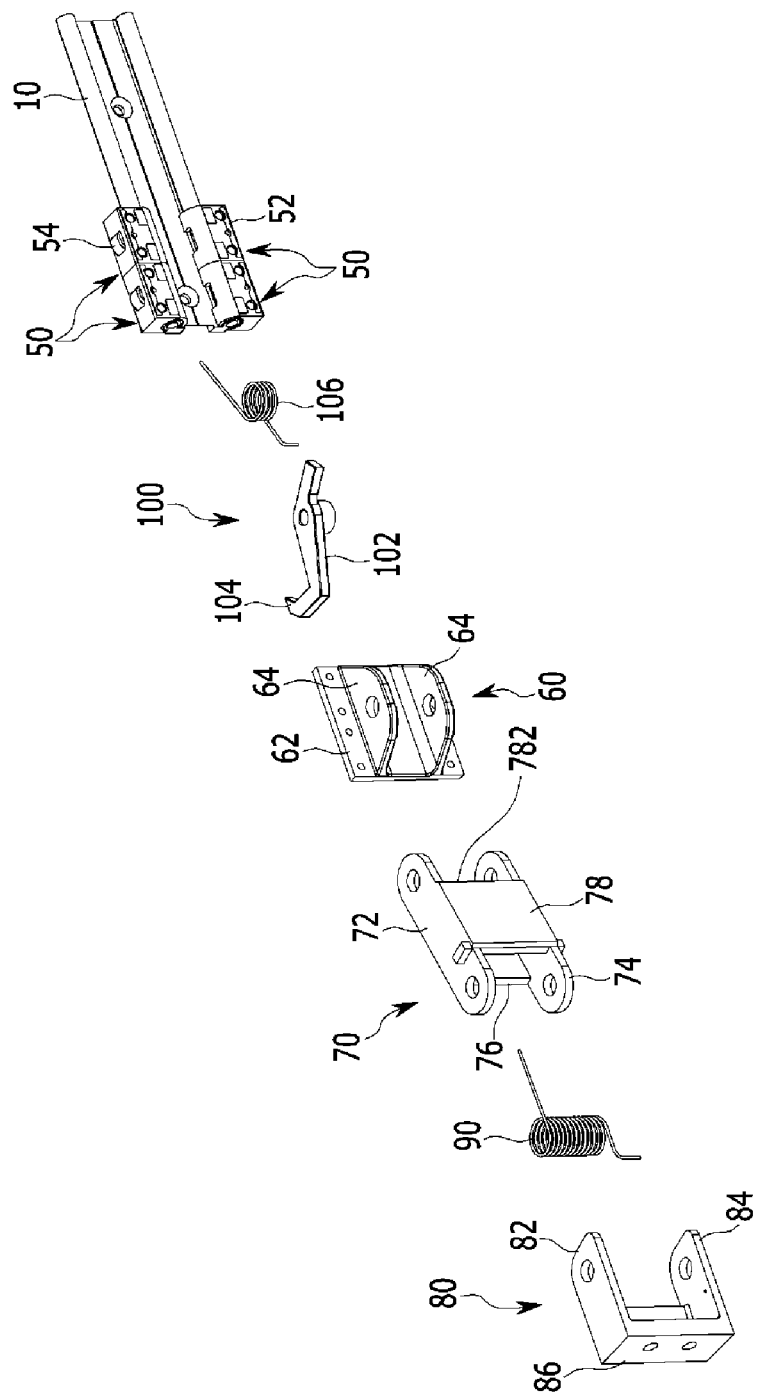
FIG. 7 is an exploded perspective view of a central support structure of a sliding door device for a vehicle according to an exemplary embodiment of the present invention.

Referring to FIGS. 6 and 7, one end of a central support structure may be relatively rotatably fastened to the door rail 10, the other end of the central support structure may be fixedly mounted on the vehicle body, and the door rail 10, and the front sliding door 1 and the rear sliding door 2 may be supported on the vehicle body to be relatively pivotable and slidably movable by the central support structure.

The central support structure may include a central slider 50, a central slider mounting bracket 60, a swing arm 70, and a vehicle body mounting bracket 80.

The central slider 50 may be coupled to be movable along the door rail 10, one end of the swing arm 70 may be coupled to the central slider mounting bracket 60 with a pin, the other end of the swing arm 70 may be coupled to the vehicle body mounting bracket 80 with the pin, and the vehicle body mounting bracket 80 may be fixedly mounted on the vehicle body.

The central slider 50 may be configured in such a manner that two central sliders 50 form one pair at an upper portion and two central sliders form one pair at a lower portion and one upper pair of central sliders 50 and one lower pair of central sliders 50 may integrally move while being mounted on the central slider mounting bracket 60.

The central slider 50 may include a slider body 52 in which the guide rail 14 of the door rail 10 is coupled to fit with a substantially quadrangular block shape and having an assembly hole for being fastened with the central slider mounting bracket 60, and multiple rollers 54 rotatably installed while being planted inward from one side of the slider body 52 and installed to roll along the guide rail 14 while surface-contacting the guide rail 14 of the door rail 10.

The central slider mounting bracket 60 may include a central slider mounting bracket body 62 having a substantially quadrangular plate shape, which is fastened to the assembly hole formed in the slider body 52 of each central slider 50 and two fastening flanges 64 that integrally protrude in a vertical direction from the central slider mounting bracket body 62.

Through assembly holes may be formed at two fastening flanges 64.

The swing arm 70 may include an upper swing arm 72 disposed at an upper portion thereof in the height direction of the vehicle, a lower swing arm 74 disposed at a lower portion thereof, and two flanges 76 and 78 having a substantially quadrangular plate shape, which connect both edges of the upper swing arm 72 and the lower swing arm 74, respectively.

A pressing edge 782 that pivots a hook by pressing the hook to be described below may be formed at one flange 78.

The through assembly hole may be formed at one edge of each of the upper swing arm 72 and the lower swing arm 74.

Two fastening flanges 64 of the central slider mounting bracket 60 are inserted between the upper swing arm 72 and the lower swing arm 74 and the pins fit in the assembly hole of each of the upper swing arm 72 and the lower swing arm 74 and the assembly holes of two fastening flanges 64 of the central slider mounting bracket 60, and as a result, the swing arm 70 may be relatively rotatably fastened to the central slider mounting bracket 60.

The vehicle body mounting bracket 80 may be formed to have a cross-section having a substantially "⊏"-shape, which includes each of a top flange 82, a bottom flange 84, and a side flange 86 connecting the top flange 82 and the bottom flange 84.

One or more through assembly holes may be formed at the side flange 86 and the side flange 86 may be mounted and fixed onto the vehicle body through the assembly holes.

The through assembly hole is formed even at each of the top flange 82 and the bottom flange 84 and the swing arm 70 is partially inserted between the top flange 82 and the bottom flange 84 to be relatively pivotably fastened and supported via the pin.

An elastic spring 90 may be mounted while being interposed between the vehicle body mounting bracket 80 and the swing arm 70 in order for the swing arm 70 to relatively pivot around the vehicle body mounting bracket 80 and thereafter, return to an original position.

That is, one end of the elastic spring 90 is connected to the vehicle body mounting bracket 80 and the other end of the elastic spring 90 is connected to the swing arm 70 to be twisted or relaxed according to a rotary motion of the swing arm 70.

A hook 100 may be pivotably mounted on a fastening portion of the swing arm 70 and the central slider mounting bracket 60 while being interposed.

The hook 100 may be pivotably fastened while fitting in fastening pins of the swing arm 70 and the central slider mounting bracket 60.

The hook 100 may include a hook body 102 which the fastening pin passes through and a hanger 104 formed at a front end of the hook body 102.

An elastic spring 106 may be provided so as for the hook 100 to pivot and thereafter, return to the original position and so as to stably maintain a state in which the hook 100 is suspended on the door rail 10.

Figure 8:
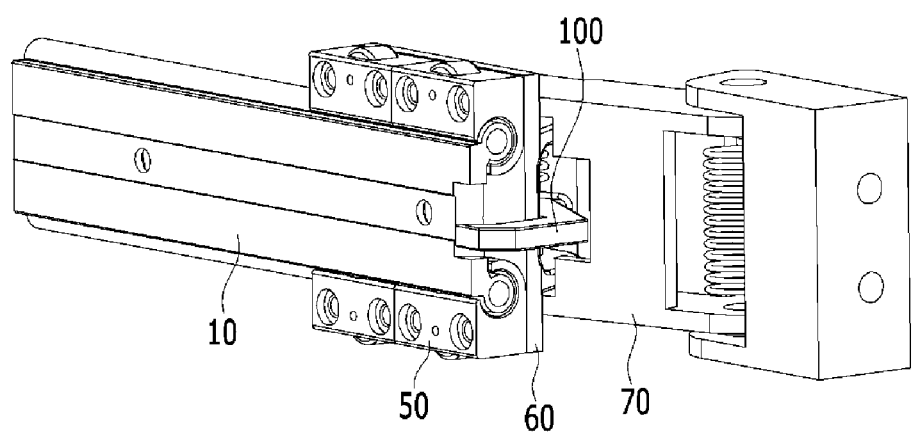
FIG. 8 is a combinational perspective view of the central support structure and a hook thereof in a sliding door device for a vehicle according to an exemplary embodiment of the present invention.

Referring to FIG. 8, while each of the front sliding door 1 and the rear sliding door 2 closes the door openings of the vehicle body, respectively, the hanger 104 of the hook 100 is suspended on the door rails 10 mounted on the front sliding door 1 and the rear sliding door 2, respectively to integrally fix the central slider mounting bracket 60, and the central slider 50 and the door rail 10, thereby preventing relative motions thereamong.

Figure 9:
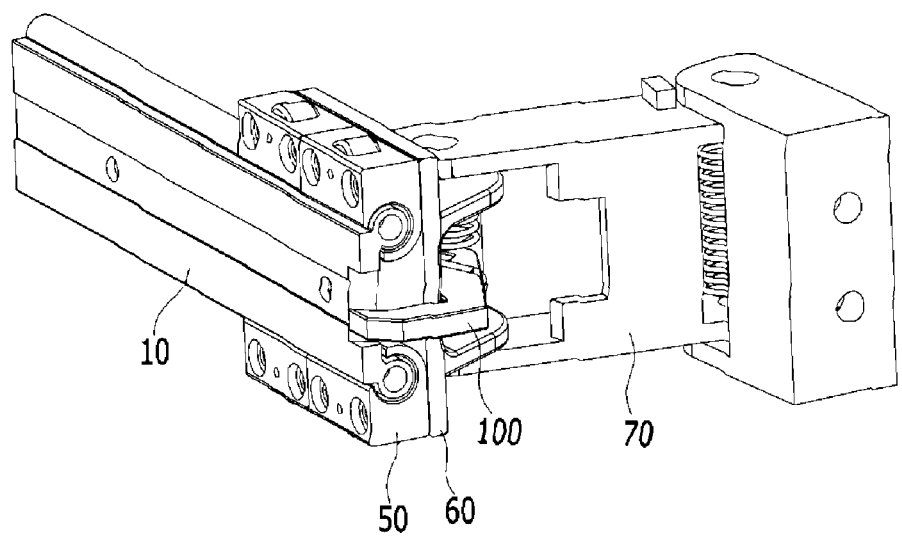
FIG. 9 is a perspective view of a state in which the hook releases a door rail in FIG. 8.

Referring to FIG. 9, when the front sliding door 1 and the rear sliding door 2 pivot in a direction to open the door opening of the vehicle body, that is, when the front sliding door 1 and the rear sliding door 2 pivots outward in the width direction of the vehicle, the swing arm 70 presses and pivots the hook 100 by pivoting together and the hanger 104 of the hook 100 is separated from the door rail 10 at the time when the pivoting motion of the front sliding door 1 and the rear sliding door 2 is completed, and as a result, the door rail 10 may slide while being coupled to the central slider 50.

Figure 10:
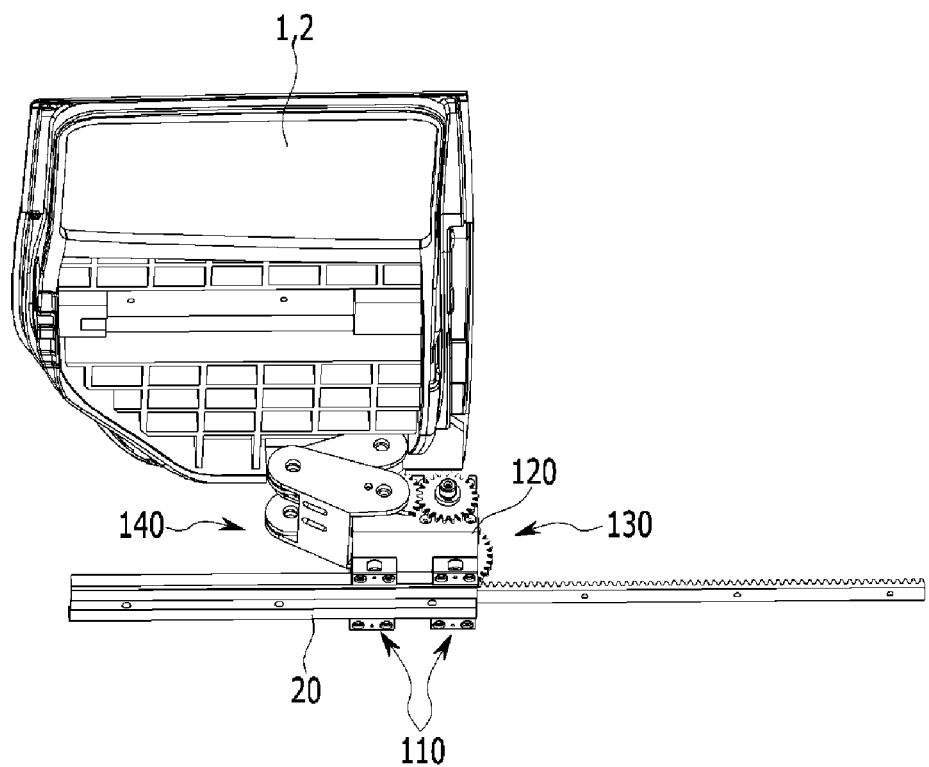
FIG. 10 is a perspective view of a lower support structure and a sliding door in a sliding door device for a vehicle according to an exemplary embodiment of the present invention.
Figure 11:
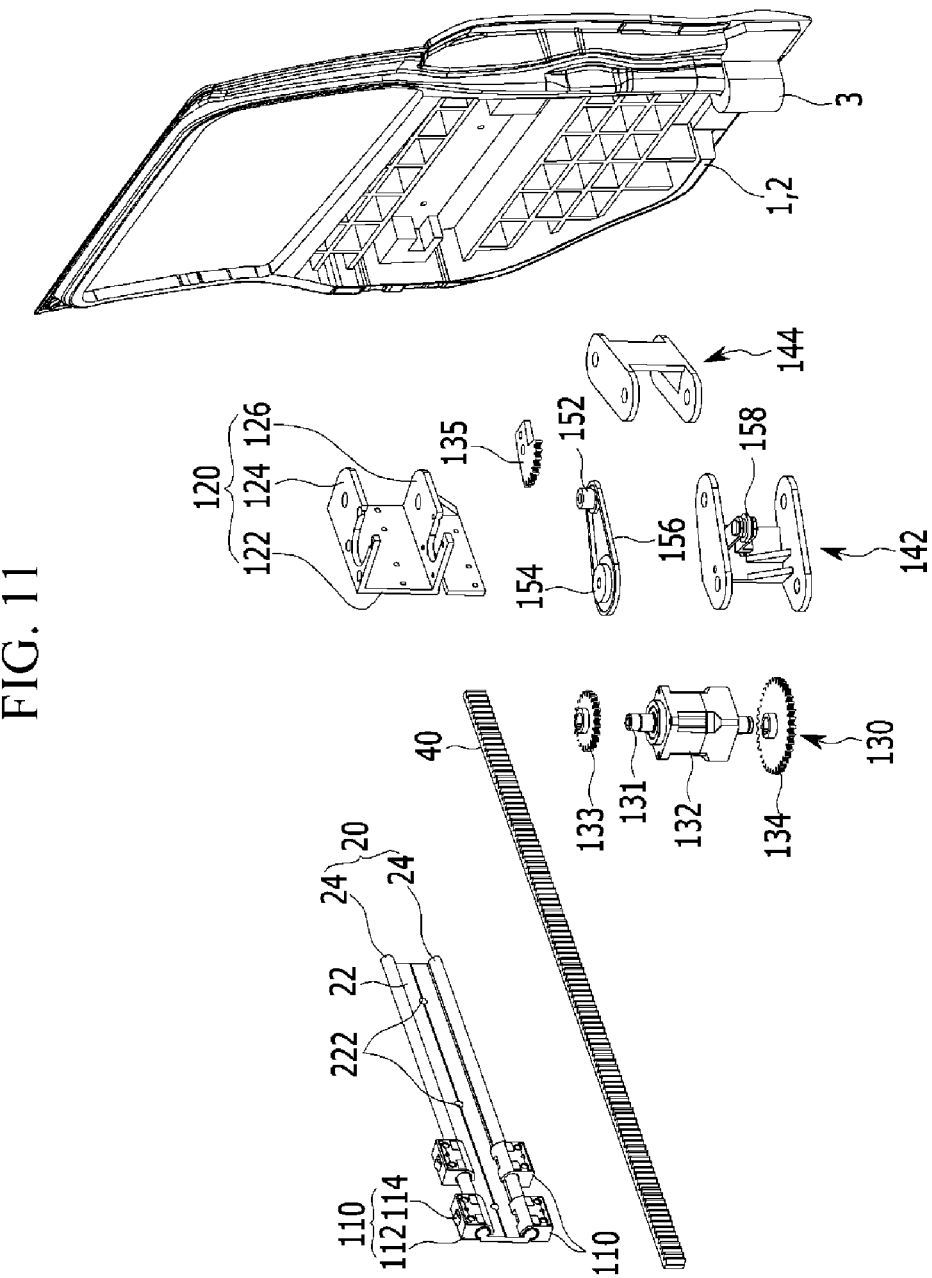
FIG. 11 is an exploded perspective view of a lower support structure of a sliding door device for a vehicle according to an exemplary embodiment of the present invention.
Figure 12:
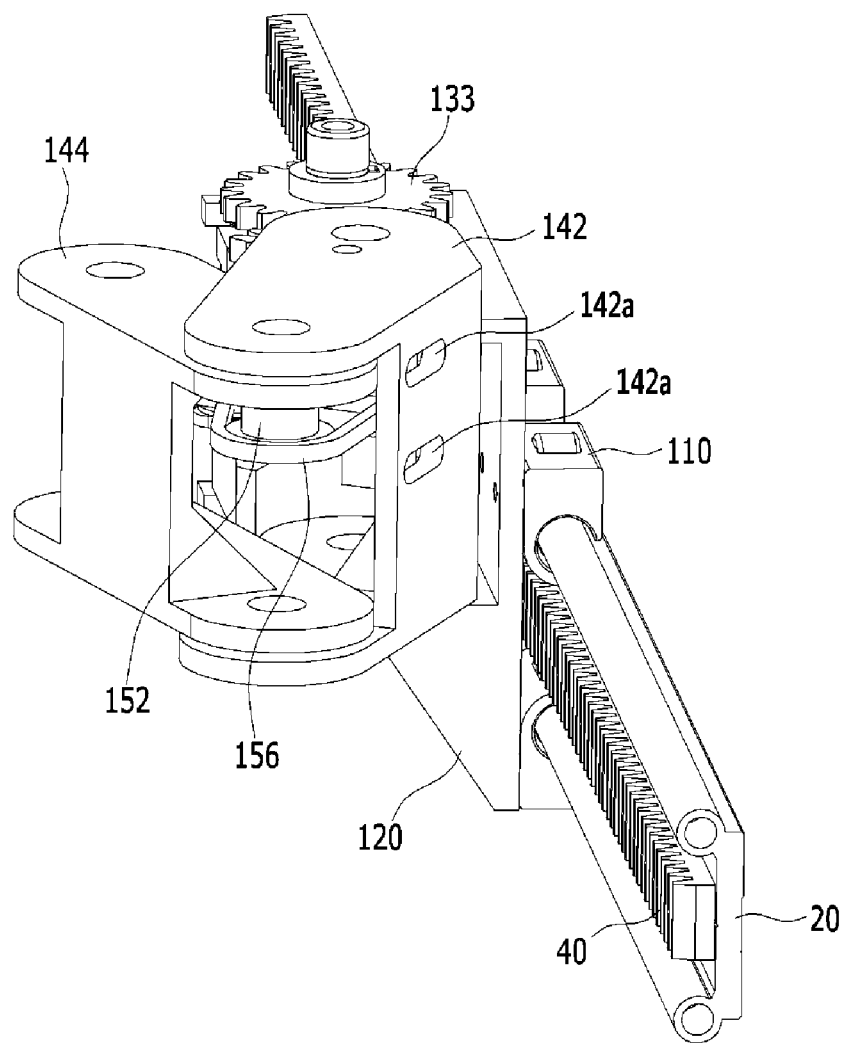
FIG. 12 is a perspective view of a lower support structure of a sliding door device for a vehicle according to an exemplary embodiment of the present invention.

Referring to FIGS. 10 to 12, lower portions of the front sliding door 1 and the rear sliding door 2 may pivot while being supported on the vehicle body rail 20 through a lower support structure and further, move along the vehicle body rail 20.

One end of the lower support structure may be coupled to the lower portions of the front sliding door 1 and the rear sliding door 2 and the other end of the lower support structure may be coupled to the vehicle body rail 20.

The lower support structure may include a lower slider 110 coupled to the vehicle body rail 20 to be movable along the vehicle body rail 20, a gear device 130 mounted on the lower slider, and a link mechanism 140 of which one end is fastened to the gear device and the other end is fastened to each of the front sliding door 1 and the rear sliding door 2.

The vehicle body rail 20 may include each of a rail body 22 having a substantially rectangular plate shape and two guide rails 24 that extend in the longitudinal direction along both edges in the width direction of the rail body 22 and protrude in a vertical direction to the rail body 22.

The guide rail 24 may be formed to have a circular cross-section.

Multiple through mounting holes 222 may be formed in the rail body 22 at a predetermined interval in the longitudinal direction.

The mounting hole 222 may be formed to assemble the vehicle body rail 20 to the rail supporter 30 with the bolt, and the like.

The lower slider 110 may be configured in such a manner that two lower sliders 110 form one pair at an upper portion and two lower sliders form one pair at a lower portion and one upper pair of lower sliders 110 may be movably installed while being inserted into the rail supporter 30 and one lower pair of lower sliders 110 may integrally move while being mounted on the lower slider mounting bracket 120.

The lower slider 110 may include a slider body 112 in which the guide rail 24 of the vehicle body rail 20 is coupled while fitting with the substantially quadrangular block shape and having an assembly hole for being fastened with the lower slider mounting bracket 120, and multiple rollers 114 rotatably installed while being planted inward from one side of the slider body 112 and installed to roll along the guide rail 24 while surface-contacting the guide rail 24 of the vehicle body rail 20.

The lower slider mounting bracket 120 may include each of a bracket body 122 onto which the lower slider 110 is fastened and supported and an upper flange 124 and a lower flange 126 that integrally extend in the vertical direction from the bracket body 122.

A mounting groove dug inward may be formed in each of the upper flange 124 and the lower flange 126 and a long hole may be formed in the bracket body 122.

The gear device 130 may include each of a planetary gear box 132 into which a gear shaft 131 is penetratively inserted and coupled, an input gear 133 which is integrally rotatably coupled to an upper portion of the gear shaft 131, an output gear 134 integrally rotatably coupled to a lower portion of the gear shaft 131 and engaging with the rack gear 40, and a transmission gear 135 engaging with the input gear 133, having an arc shape, and mounted on the link mechanism 140.

A planetary gear may be incorporated in the planetary gear box 132. The planetary gear may increase and output an input RPM approximately 8 to 12 times.

The link mechanism 140 may include each of a first link 142 of which one end is fastened to the transmission gear 135, which has the cross-section with the substantially "⊏" shape and a second link 144 of which one end is fastened to the other end of the first ink 142 and the other end is fastened to the lower portions of the front sliding door 1 and the rear sliding door 2.

Each of the first link 142 and the second link 144 includes an upper flange and a lower flange with the through assembly holes, and a connection flange connecting the upper flange and the lower flange to have the substantially "⊏" shaped cross-section.

A fastening boss 3 which is fastened to the other end of the second link 144 with the pin may integrally protrude at the lower edges of the front sliding door 1 and the rear sliding door 2.

A first chain gear 152 may be integrally fastened to a fastening portion where the other end of the first link 142 and one end of the second link 144 are fastened to each other.

A second chain gear 154 may be integrally fastened to a portion where one end of the first link 142 and the transmission gear 135 are fastened to each other.

The first chain gear 152 and the second chain gear 154 may be connected with each other with a chain 156 so as to transfer the rotary motion.

A chain tensioner 158 for controlling tension of the chain 156 may be installed in the first link 142.

Figure 13:
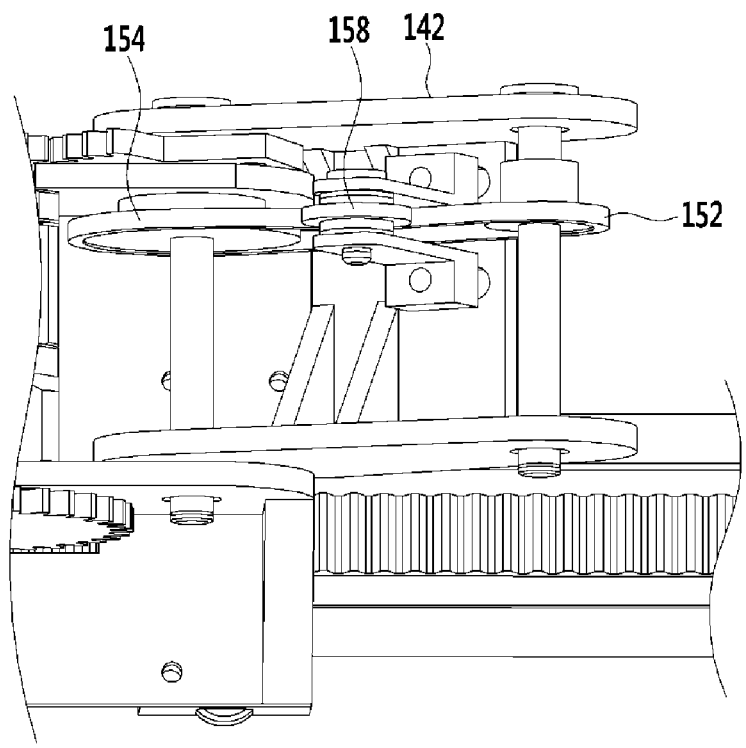
FIG. 13 is a mounting perspective view of a chain tensioner of a sliding door device for a vehicle according to an exemplary embodiment of the present invention.
Figure 14:
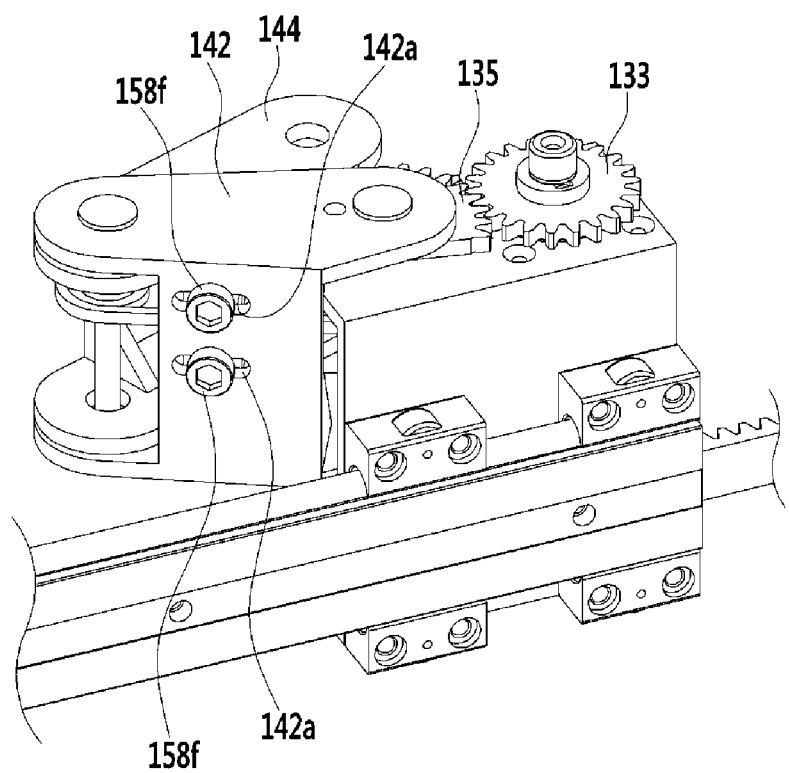
FIG. 14 is a perspective view of a link mechanism and a gear device of a sliding door device for a vehicle for the vehicle according to an exemplary embodiment of the present invention.
Figure 15:
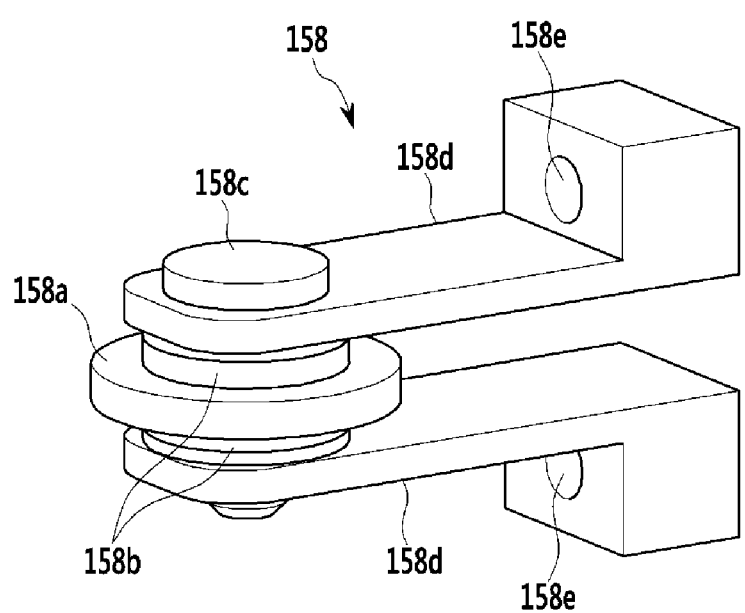
FIG. 15 is a perspective view of a chain tensioner of a sliding door device for a vehicle according to an exemplary embodiment of the present invention.

Referring to FIGS. 13 to 15, the chain tensioner 158 may include a third chain gear 158a through which the chain 156 passes, two bushes 158b supporting a third chain gear 158a with the third chain gear 158a interposed therebetween, an assembly pin 158c fastened through two pushes 158b and the third chain gear 158a to rotatably support two bushes 158b and the third chain gear 158a, and two chain tensioner bodies 158d through which the third chain gear 158a is fastened with the assembly pin 158c and rotatably supported and mounted on the first link 142.

A through assembly hole 158e is formed in each of two chain tensioner bodies 158d to be mounted on the first link 142 via an assembly bolt through the assembly hole.

As illustrated in detail in FIG. 14, two assembly bolts 158f may be fastened to two chain tensioner bodies 158d through the first link 142, respectively and two long holes 142a may be formed in the first link 142 in order to control tension of the chain 156 by controlling assembly positions of the assembly bolts 158f.

Figure 16:
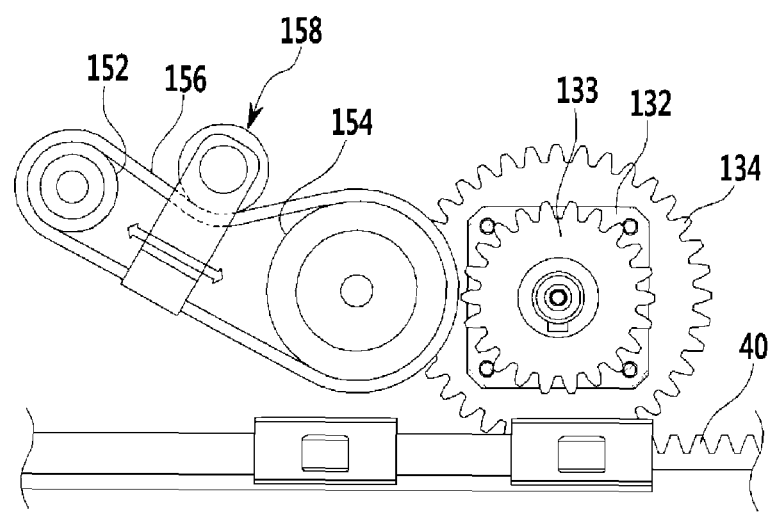
FIG. 16 is an operational explanation diagram of a chain tensioner of a sliding door device for a vehicle according to an exemplary embodiment of the present invention.

That is, as illustrated in FIG. 16, a diameter of the first chain gear 152 is formed to be smaller than a diameter of the second chain gear 154 to control a diameter ratio of the first chain gear 152 and the second chain gear 154 so that a second drum 154 rotates approximately twice while the first chain gear 152 rotates once and when the chain tensioner 158 is installed at a predetermined portion along the chain 156 so as to apply appropriate tension to the chain 156 as illustrated with an arrow, the third chain gear 158a pushes the chain 156 in a direction to reduce the width of a chain trajectory formed by the chain 156, and as a result, the tension of the chain 156 may be appropriately controlled.

Opening/closing operation force of the sliding door of a user is transferred to the gear device 130 through the first link 142 and the second link 144 by appropriately controlling the chain 156, and as a result, the front and rear sliding doors may smoothly slidably move.

Referring to FIGS. 1 to 3, and 8, since the hook 100 is suspended on the door rail 10 while the front sliding door 1 and the rear sliding door 2 close the door opening of the vehicle body, the front sliding door 1 and the rear sliding door 2 may not be opened.

For example, when the user pulls a door handle in order to open the front sliding door 1 and/or the rear sliding door 2, the front sliding door 1 and/or the rear sliding door 2 are opened in the width direction of the vehicle while being released from a door latch, but since the hook 100 is still suspended on the door rail 10, the front sliding door 1 and/or the rear sliding door 2 may not slidably move.

When the front sliding door 1 and/or the rear sliding door 2 are pulled outward in the width direction of the vehicle by operation force of the user, the swing arm 70 of an upper support structure rotates and the lower slider 110 slidably moves along the vehicle body rail 20 while the first link 142 and the second link 144 of the lower support structure also rotate with rotation of the swing arm 70, and as a result, the front sliding door 1 and/or the rear sliding door 2 perform the rotary motion pulled outward in the width direction of the vehicle.

In this case, by operation force to pull the front sliding door 1 and/or the rear sliding door 2 outward in the width direction of the vehicle, the second link 144 performs the rotary motion, the rotary motion of the second link 144 rotates the first link 142 and the first chain gear 152, the rotary motion of the first chain gear 152 rotates the second chain gear 154 through the chain 156, the rotary motion of the second chain gear 154 rotates the input gear 133 through the transmission gear 135, the rotary motion of the input gear 133 rotates the output gear 134 through the gear shaft 131 and the planetary gear box 132 the increased number of rotation times, and as a result, the output gear 134 moves along the rack gear 40 while rotating with engaging in the rack gear 40.

When the swing arm 70 continuously rotates by continuous operation force of the user, the hook 100 rotates by being pushed by the swing arm 70 to release an inter-locking state of the central slider 50 and the door rail 10 and in this state, when the user pushes the front sliding door 1 forward in the longitudinal direction of the vehicle, the central slider 50 moves along the door rail 10 and the lower slider 110 moves along the vehicle body rail 20, and as a result, the front sliding door 1 may fully open the front door opening while slidably moving.

Further, the central slider 50 of the rear sliding door 2 also moves along the door rail 10 and the lower slider 110 thereof moves along the vehicle body rail 20 to fully open the rear door opening while slidably moving backward in the longitudinal direction of the vehicle.

The front sliding door 1 and the rear sliding door 2 may maintain an opened state by the door latch while the front sliding door 1 and the rear sliding door 2 are fully opened and further, the door opening may be sealed by slidably moving the front sliding door 1 and the rear sliding door 2 backward and forward of the vehicle, respectively through releasing the door latch by the operation of the user.

Figure 17:
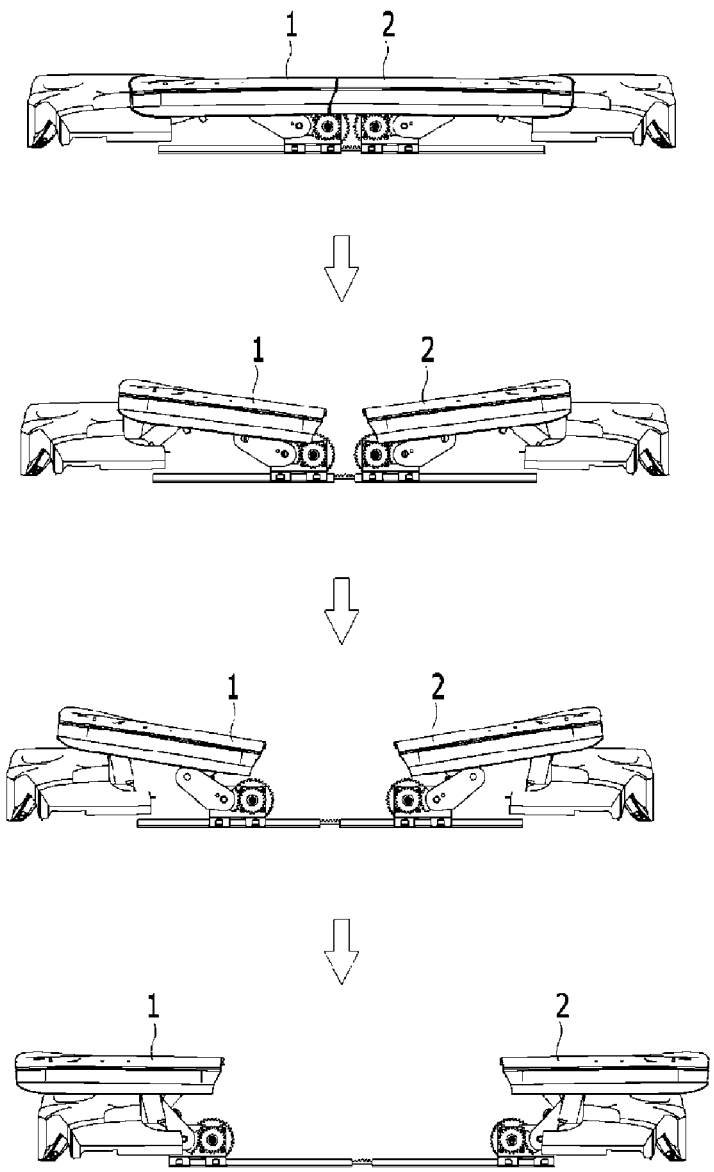
FIG. 17 illustrates a series of operational states until a sliding door of a sliding door device for a vehicle fully opens after closing the door opening of the vehicle body according to an exemplary embodiment of the present invention.

Referring to FIG. 17, a series of operation processes to fully open the door opening from a state in which the front sliding door 1 and the rear sliding door 2 close the door opening according to some exemplary embodiments of the present invention are illustrated.

For convenience in explanation and accurate definition in the appended claims, the terms "upper" or "lower", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sliding door device for a vehicle, comprising:
   a sliding door opening and closing a door opening formed in a vehicle body;
   a door rail mounted on the sliding door;
   a vehicle body rail mounted on the vehicle body;
   a central support structure for movably supporting the sliding door, wherein the central support structure includes a central slider and is fixedly mounted on the vehicle body, wherein the central slider is coupled to the door rail and movable along the door rail;
   a hook releasably locking the central support structure to the door rail; and
   a lower support structure for movably supporting a lower portion of the sliding door, wherein the lower support structure is connected to the lower portion of the sliding door, wherein the lower support structure includes:
      a lower slider, wherein the lower slider is coupled to the vehicle body rail and movable along the vehicle body rail,
      a gear device mounted on the lower slider,
      a link mechanism of which a first end is connected to the gear device and a second end is connected to the sliding door,
      a chain transmitting a motion of the link mechanism to the gear device, and
      a chain tensioner controlling tension of the chain,
   wherein the gear device includes:
      a rack gear mounted on the vehicle body rail;
      a gear shaft;
      a planetary gear box into which the gear shaft is inserted and coupled;
      an input gear rotatably coupled to an upper portion of the gear shaft;
      an output gear fixed to a lower portion of the gear shaft and rotatable with the gear shaft, wherein the output gear is engaged with the rack gear; and
      a transmission gear engaged with the input gear, having an arc shape, and mounted on the link mechanism, and
   wherein the link mechanism includes:
      a first link having a cross-section in a substantially "C" shape, of which a first end is fastened with the transmission gear;
      a second link of which a first end is fastened to a second end of the first link and a second end is fastened to the lower portion of the sliding door;
   a first chain gear; and
   a second chain gear;
   wherein the chain tensioner includes:
      a third chain gear through which the chain passes;
      two bushes supporting the third chain gear with the third chain gear interposed therebetween;
      an assembly pin fastened with the two bushes through the third chain gear to rotatably support the two bushes; and
      a chain tensioner body fastened with the third chain gear with the assembly pin to rotatably support the third chain gear and mounted on the first link.

2. The sliding door device of claim 1, wherein each of the door rail and the vehicle body rail includes:
   a rail body having a substantially rectangular plate shape; and
   two guide rails which extend in a longitudinal direction along a first edge and a second edge in a width direction of the rail body and protrude in a direction substantially perpendicular to the rail body.

3. The sliding door device of claim 2, wherein:
   the vehicle body rail is mounted on the vehicle body through a rail supporter.

4. The sliding door device of claim 1, wherein the central slider includes:
   a slider body in which a guide rail of the door rail is coupled to fit with a substantially quadrangular block shape; and
   a roller rotatably installed in the slider body and rollable along the guide rail while surface-contacting the guide rail of the door rail.

5. The sliding door device of claim 4, wherein the central slider includes:
   a central slider mounting bracket;
   a first pair of sliders mounted at an upper portion of the central slider mounting bracket; and
   a second pair of sliders mounted at a lower portion of the central slider mounting bracket.

6. The sliding door device of claim 5, wherein the central support structure includes:
   a vehicle body mounting bracket fixedly mounted on the vehicle body; and
   a swing arm of which a first end is rotatably coupled to the vehicle body mounting bracket and a second end is rotatably coupled to the central slider mounting bracket.

7. The sliding door device of claim 6, wherein the swing arm includes:
an upper swing arm member disposed at an upper portion in a height direction of the swing arm;
a lower swing arm member disposed at a lower portion in the height direction of the swing arm;
two flanges having a substantially quadrangular plate shape, which connect both edges of the upper swing arm member and the lower swing arm member; and
a pressing edge which presses and pivots the hook is formed at one of the two flanges.

8. The sliding door device of claim 7, wherein:
through assembly holes are formed at one edge of each of the upper swing arm member and the lower swing arm member;
two fastening flanges are provided in the central slider mounting bracket; and
the two fastening flanges of the central slider mounting bracket are inserted between the upper swing arm member and the lower swing arm member to be rotatably coupled.

9. The sliding door device of claim 6, wherein:
the vehicle body mounting bracket has a cross-section in a substantially "C" shape and includes a top flange, a bottom flange, and a side flange connecting the top flange and the bottom flange;
one or more through assembly holes are formed at the side flange, which is mounted on the vehicle body through the assembly holes; and
through assembly holes are formed at each of the top flange and the bottom flange and the swing arm is partially inserted between the top flange and the bottom flange to pivotably coupled.

10. The sliding door device of claim 6, wherein:
an elastic spring is interposed between the vehicle body mounting bracket and the swing arm to return the swing arm to an original position after the swing arm pivots with respect to the vehicle body mounting bracket.

11. The sliding door device of claim 1, wherein:
a fastening boss fastened with the second end of the second link with a pin is integrally formed to protrude at a lower edge of the sliding door.

12. The sliding door device of claim 1, wherein:
the first chain gear is integrally fastened to a fastening portion where the first end of the first link and the first end of the second link are fastened to each other;
the second chain gear is integrally fastened to a portion where the first end of the first link and the transmission gear is fastened to each other; and
the first chain gear and the second chain gear are connected to each other by the chain to transfer a rotary motion.

13. The sliding door device of claim 12, wherein:
the chain tensioner is installed to be supported on the first link.

14. The sliding door device of claim 12, wherein:
a diameter of the first chain gear is smaller than a diameter of the second chain gear.

15. The sliding door device of claim 1, wherein:
the chain tensioner body is fastened to the first link through an assembly bolt; and
the assembly bolt is inserted into the first link and a long hole capable of controlling an assembly position is formed in the first link.

\* \* \* \* \*